ADDING AND SUBTRACTING APPARATUS

Filed Jan. 28, 1957 2 Sheets-Sheet 1

INVENTOR:
Benjamin Kessel,
BY Bair, Freeman & Molinare
ATTORNEYS.

April 26, 1960 B. KESSEL 2,934,271

ADDING AND SUBTRACTING APPARATUS

Filed Jan. 28, 1957 2 Sheets-Sheet 2

INVENTOR:
Benjamin Kessel,
BY Bair, Freeman & Molinare
ATTORNEYS.

2,934,271

ADDING AND SUBTRACTING APPARATUS

Benjamin Kessel, Natick, Mass., assignor, by mesne assignments, to Minneapolis-Honeywell Regulator Company, a corporation of Delaware Application January 28, 1957, Serial No. 636,673

19 Claims. (Cl. 235—176)

This invention relates generally to new and improved data processing apparatus and more particularly to new and improved electronic computing apparatus for effecting serial addition and subtraction of digital information.

Various types of data processing systems are known in the art in which electrical pulses representing digital information are processed in a serial or bit by bit fashion to carry out addition and/or subtraction operations. Conveniently, the digital information is processed in the binary form of notation, i.e., in groups of time spaced bits or pulse positions in which there is an electrical pulse for each bit representing a binary one and no electrical pulse for each bit representing a binary zero.

In the serial addition of two binary numbers, the sum digit for each digit position is a function of the two input digits of the corresponding binary weights and the values of the preceding lower order digits of the two numbers. Information on the lower order digits ordinarily is obtained in the form of a carry input which is derived from the preceding lower order digits and stored until required. Accordingly, the conventional prior art serial adder has three inputs; the two digits to be added and the stored carry.

The circuit realizations of these prior art binary serial adders generally have taken such forms as two half-adders, each having two inputs; a collection of gates, buffers and outputs properly interconnected to produce the required sum and carry outputs from the three digit inputs; and in computing apparatus utilizing logical circuit groups, a pair of logical packages; one for the sum output and one for the carry output.

It is a general object of this invention to provide new and improved computing apparatus for effecting a serial arithmetic operation on a pair of binary represented numbers.

More specifically, it is an object of this invention to provide an improved serial binary adder which is adapted to effect an addition of two binary numbers without the need for generating and storing carry digits.

It is another object of this invention to provide an improved serial binary subtractor which is adapted to subtract one binary number from another binary number without generating and storing borrow digits.

It is still another object of this invention to provide a new and improved electronic computing apparatus which is capable of carrying out complete addition and subtraction operations with only a single output; namely, the sum or difference data, respectively.

It is a further object of this invention to provide a new and improved logical computing apparatus in which the complete arithmetic circuit is realized with a single logical package.

It is a still further object of this invention to provide new and improved computing apparatus which is characterized by its relative simplicity and the economy achieved by the savings realized in the number of tubes and components required.

These and other objects are realized in accordance with the features of one specific illustrative embodiment in which the serial addition of two binary numbers is effected without the generation or storage of a carry digit. The adder comprises a single logical package which advantageously includes a pair of gating structures of the type disclosed generally in an article by N. S. Zimbel entitled "Packaged Logical Circuitry for 4 mc. Computer," Convention Record of I.R.E., 1954, National Convention, part IV, pages 133 to 139; and in an article by F.R. Dean entitled "Basic Gating Package for Computing Operations," Electronic Equipment, February 1956, pages 14 to 16.

Each gating structure in the single logical package comprises a plurality of input gate legs arranged such that a signal is passed to the output of the gate only when a signal is present on all of the input gate legs. This type of gate frequency is referred to as an AND or coincidence gate. Two input leads are buffered to each gate leg to the end that the activation of either leg is effective to activate the associated gate leg.

In accordance with a feature of this invention, the various pairs of input leads have applied thereto a predetermined arrangement of signals or data digits corresponding to the two binary digits to be added, the two binary digits previously added and delayed one pulse period, the sum digit of the previous addition which has an inherent delay of one pulse period, and the negation or complement of each of these digits. The outputs of the two gate structures are buffered to a single output lead which is activated by a pulse for each sum digit representative of a binary one and which is not activated for each sum digit representative of a binary zero.

In a second specific illustrative embodiment of the invention, the subtraction of one binary number from another binary number is carried out in a serial fashion without the generation or storage of a carried digit. As in the adder described above, the subtractor comprises a single logical package which includes a pair of coincidence gate structures in which a plurality of input leads are buffered to a number of gate legs such that an output signal is produced by the gate only when all of the gate legs are activated.

In accordance with this second illustrative embodiment of the invention, the various pairs of input leads have applied thereto a predetermined arrangement of signals or data digits corresponding to the two binary digits to be subtracted, the two binary digits previously subtracted and delayed one pulse period, the difference digit of the previous subtraction which has an inherent delay of one pulse period, and the negation or complement of each of these digits. The outputs of the two coincidence gate structures are buffered together to a single output lead upon which is produced an electrical pulse if the difference digit is a binary one and no electrical pulse if the difference digit is a binary zero.

Thus, in accordance with the aforementioned features, a still further object of the present invention is to provide a computing circuit having input circuits and an output circuit arranged so that the signals on the output may be fed back to the input to be combined with the input signals which first created the output signal.

The above and other features of novelty which characterize the invention are pointed out with particularity in the claims appended to and forming a part of this specification. For a better understanding of this invention, however, its advantages and specific objects attained by its use, reference is had to the accompanying drawing and descriptive material in which is shown and described several illustrative embodiments of the invention.

Figures 1, 2, 4, 5:
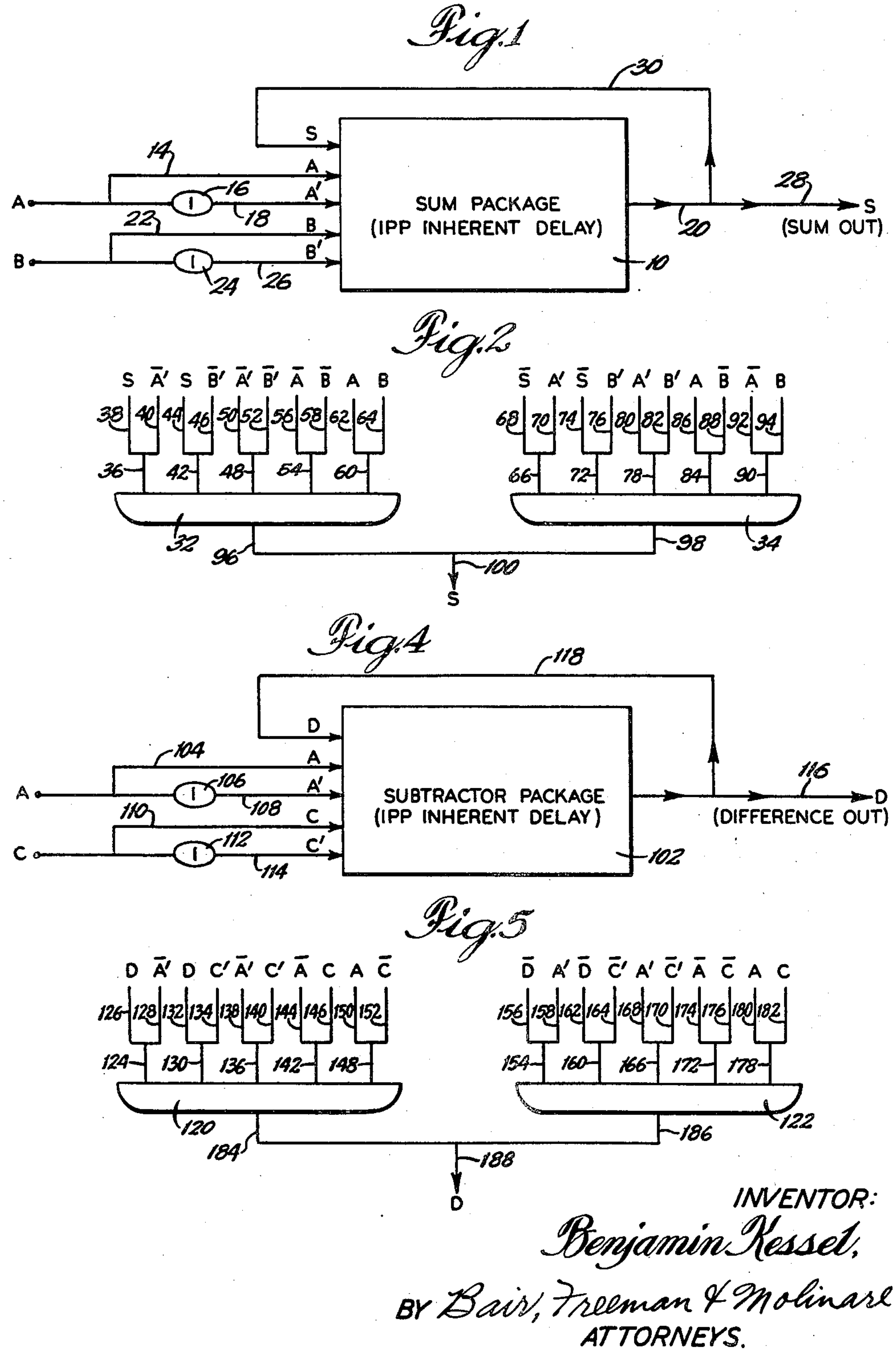
Figure 1 is a block diagram of a single package adder embodying principles of the invention.
Figure 2 is a logical diagram representation of an illustrative single package adder of the general type shown in Figure 1.
Figure 4 is a block diagram of a single package subtractor embodying principles of the invention.
Figure 5 is a logical diagram of an illustrative single package subtractor of the general type shown in Figure 4.

Referring now to the drawing and more particularly to the single package adder shown in Figure 1 thereof, it can be seen that the only inputs required for the logical adder of the invention are the sum digit, the addend digits and the augend digits. Thus, the invention differs from conventional prior art adders in that there is no provision for a carry input. The elimination in the present invention of the need for generating and storing a carry can be understood from a consideration of prior art adding techniques.

Conventionally, in prior art adders and even in ordinary paper and pencil addition, the addition of two numbers is effected through sum and carry techniques. The rules for the production of the sum and carry digits in the conventional addition technique can be set forth in the following table:

| Input | | | Output | | |
|---|---|---|---|---|---|
| A | B | C′ | S | C | $\bar{S}$ |
| 0 | 0 | 0 | 0 | 0 | 1 |
| 0 | 0 | 1 | 1 | 0 | 0 |
| 0 | 1 | 0 | 1 | 0 | 0 |
| 0 | 1 | 1 | 0 | 1 | 1 |
| 1 | 0 | 0 | 1 | 0 | 0 |
| 1 | 0 | 1 | 0 | 1 | 1 |
| 1 | 1 | 0 | 0 | 1 | 1 |
| 1 | 1 | 1 | 1 | 1 | 0 |

where:

A is the addend digit,
B is the augend digit,
C′ is the carry digit from the previous lower order addition,
S is the sum digit,
C is the carry digit, and
$\bar{S}$ is the negation or complement of the sum digit.

The addition truth table for conventional or normal adders listed above shows that the complement of the sum digit, $\bar{S}$, and the assertion of the carry output digit, C, are identical except in the first and last lines of the truth table, which correspond to inputs "0 0 0" and "1 1 1," respectively. Therefore, it will be appreciated that if special provisions are made for these two sets of conditions, the normally applied carry input to the adder can be replaced by the negation or complement of the sum digit.

The special provision for the input conditions where the input digits are "0 0 0" or "1 1 1" need take into account only the values of the previous lower order addend and augend input digits, A′ and B′ since the carry rules for $\bar{A}\cdot\bar{B}$ are independent of the condition of C, and similarly the carry rules for $A\cdot B$ are independent of C. The carry output replacement becomes:

$$C=[\bar{S}\cdot(\overline{\bar{A}\cdot\bar{B}})]v(A\cdot B)$$
$$=(\bar{S}\cdot A)v(\bar{S}\cdot B)v(A\cdot B)$$

It will be understood by those skilled in the art that the above equations may be realized by a two-out-of-three gate. These equations may also be written in the following form:

$$C=(\bar{S}vA)\cdot(\bar{S}vB)\cdot(AvB)$$

In a similar manner it can be shown that:

$$\bar{C}=(S\cdot\bar{A})v(S\cdot\bar{B})v(\bar{A}\cdot\bar{B}) \text{ or }$$
$$(Sv\bar{A})\cdot(Sv\bar{B})\cdot(\bar{A}v\bar{B})$$

From the above equations it is apparent that the creation of a carry output digit is not necessary since the carry digit or its complement may be replaced by an equivalent logical function generator having an input corresponding to the previous lower order addend and augend digits and the previous sum digit. Thus, it is a feature of the invention that the carry digit is eliminated by applying to the single package adder (1) the output sum digit resulting from the previous lower order set of input digits, (2) the previous lower order set of input digits, and (3) the input addend and augend digits.

As shown in Figure 1, these data digit inputs are realized by feeding into the adder the previous sum digit S which is delayed one pulse period due to the inherent delay in the adder and the previous lower order digits A′ and B′ which are delayed one pulse period by the use of suitable delay apparatus. Thus, the addend digit A is applied to logical adder 10 in one path over conductor 14 and in a second path through a one pulse period delay means 16 and conductor 18. Similarly, the augend digit B is applied to logical adder 10 in one path through conductor 22 and in a second path over one pulse period delay means 24 and conductor 26. The output sum digit S from the logic adder 10 is applied from conductor 20 to an output conductor 28, and to a feed back conductor 30 for enabling the sum digit to be applied to the input of logic adder 10.

One illustrative logical circuit embodiment of the single package adder is shown in Figure 2 of the drawing and comprises a pair of coincidence gate circuits 32 and 34 which advantageously are of the type generally shown in the above-identified Zimbel and Dean articles in which a pulse is present at the gate circuit output only upon the activation of all of the gate circuit inputs. A plurality of gate legs are connected to the inputs of each gate circuit and in accordance with the above requirements, all of the gate legs must be activated in order to pass a pulse through the gate circuit. Each gate leg has a pair of input leads buffered thereto and the input information is supplied to the input leads in accordance with a predetermined arrangement to provide the desired adding function.

More specifically, gate leg input 36 of gate circuit 32 has buffered thereto a pair of input leads 38 and 40 for receiving signals representative of the previous sum digit S and the complement of the previous addend digit $\bar{A}'$, respectively. Gate leg input 42 has buffered thereto a pair of input leads 44 and 46 for receiving signals representative of the previous sum digit S and the complement of the previous augend digit $\bar{B}'$, respectively. Gate leg input 48 has buffered thereto input leads 50 and 52 for receiving signals representative of the complements of the previous addend and augend digits, $\bar{A}'$ and $\bar{B}$, respectively. Gate leg input 54 has buffered thereto input leads 56 and 58 for receiving signals representative of the complements of the input addend and augend digits, $\bar{A}$ and $\bar{B}$, respectively. Gate leg 60 has buffered thereto input leads 62 and 64 for receiving signals representative of the input addend and augend digits, A and B, respectively.

In a similar manner, gating package 34 has gate legs 66, 72, 78, 84 and 90 connected at its input. Gate leg 66 has a pair of input leads 68 and 70 buffered thereto for receiving signals representative of the complement of the previous sum digit $\bar{S}$ and the previous addend digit A′, respectively. Gate leg 72 has input leads 74 and 76 buffered thereto for receiving signals representative of the complement of the previous sum digit $\bar{S}$ and the previous augend digit B′, respectively. Gate leg 78 has input leads 80 and 82 buffered thereto for receiving signals representative of the previous addend digit A' and the previous augend digit B', respectively. Gate leg 84 has input leads 86 and 88 buffered thereto for receiving signals representative of the addend digit A and the complement of the augend digit B̄, respectively. Gate leg 90 has a pair of input leads 92 and 94 buffered thereto for receiving signals representative of the complement of the addend digit Ā and augend digit B, respectively.

The output conductor 96 of gate circuit 32 and the output conductor 98 of gate circuit 34 are buffered to a single output conductor 100. In the operation of the single package logical adder, output conductor 100 will have an electrical pulse representative of a binary "1" thereon and no electrical signal representative of a binary "0" thereon in accordance with the following truth table:

*Adder*

| Inputs | | | | | Output |
|---|---|---|---|---|---|
| A | B | S | A' | B' | S |
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 1 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 1 |
| 0 | 1 | 0 | 0 | 0 | 1 |
| 0 | 1 | 0 | 0 | 1 | 0 |
| 0 | 1 | 0 | 1 | 0 | 0 |
| 0 | 1 | 0 | 1 | 1 | 0 |
| 0 | 1 | 1 | 0 | 0 | 1 |
| 0 | 1 | 1 | 0 | 1 | 1 |
| 0 | 1 | 1 | 1 | 0 | 1 |
| 0 | 1 | 1 | 1 | 1 | 0 |
| 1 | 0 | 0 | 0 | 0 | 1 |
| 1 | 0 | 0 | 0 | 1 | 0 |
| 1 | 0 | 0 | 1 | 0 | 0 |
| 1 | 0 | 0 | 1 | 1 | 0 |
| 1 | 0 | 1 | 0 | 0 | 1 |
| 1 | 0 | 1 | 0 | 1 | 1 |
| 1 | 0 | 1 | 1 | 0 | 1 |
| 1 | 0 | 1 | 1 | 1 | 0 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 1 |
| 1 | 1 | 1 | 0 | 0 | 0 |
| 1 | 1 | 1 | 0 | 1 | 0 |
| 1 | 1 | 1 | 1 | 0 | 0 |
| 1 | 1 | 1 | 1 | 1 | 1 |

Figure 3:
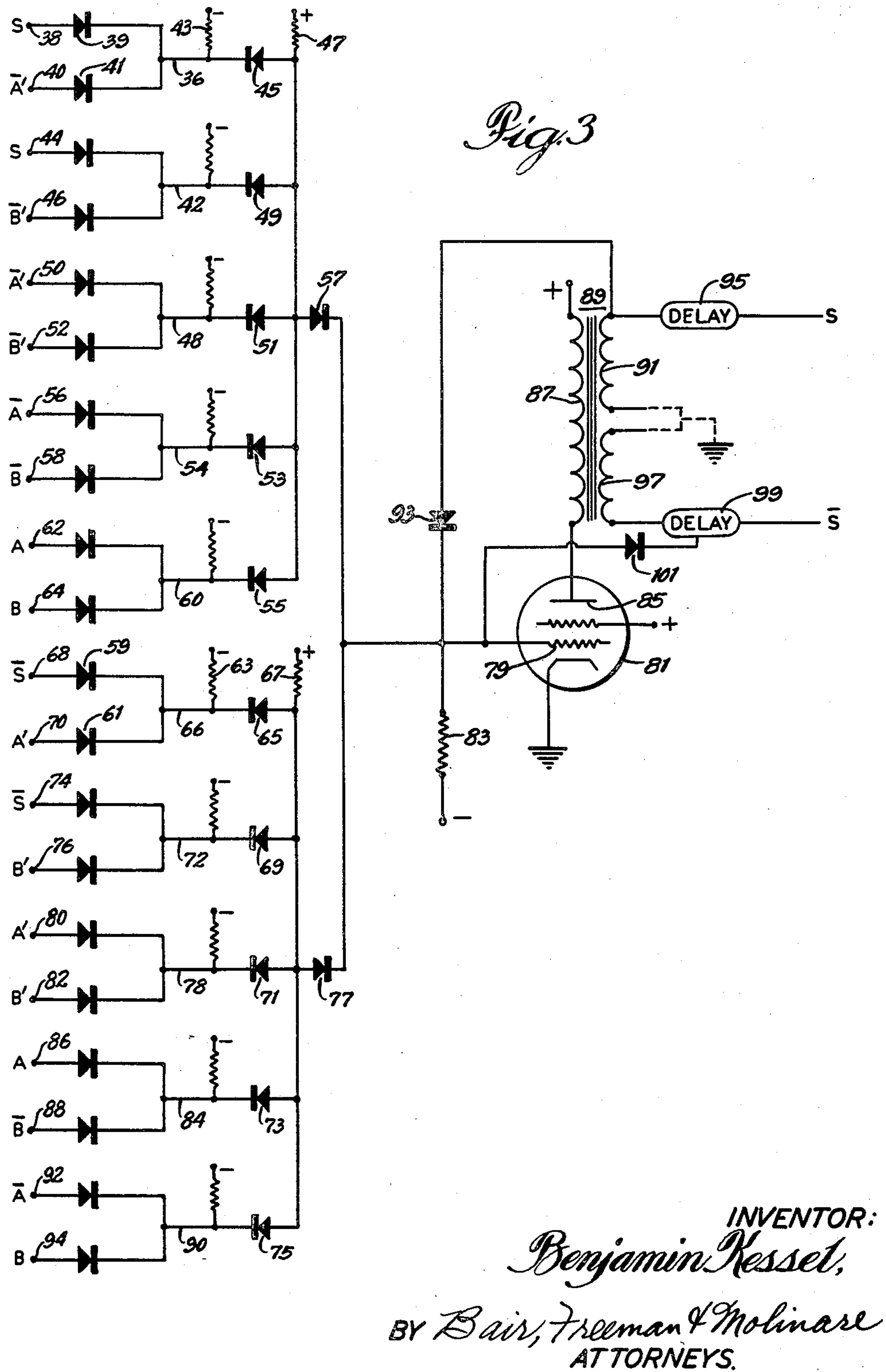
Figure 3 is an illustrative circuit realization of the single package adder of Figure 2.

The single package adder shown in Figure 2 advantageously may be realized in a specific circuit embodiment of the type shown in Figure 3. This circuit comprises a first gate including gate leg diodes 45, 49, 51, 53 and 55 which are connected through a suitable resistance such as resistance 47, to a source of positive potential. These diodes are arranged to form a coincidence or AND gate such that an output will be present only when all of the diodes are changed from their normal to their activated states. It will be understood by those skilled in the art that the diodes may be biased so that they are normally conducting and are rendered nonconducting when activated, or, alternatively, the diodes may be biased so that they are normally nonconducting and become conducting when activated.

Each gate leg diode is connected to a pair of input leads through a pair of input diodes, such as diodes 39 and 41 associated with gate leg diode 45. Each pair of input diodes is connected to a negative potential source through a resistance, such as resistance 43 for diodes 39 and 41, to form an OR gate. Thus, when either of the input diodes in each OR gate is changed from its normal to its activated state, a signal will be passed from the input lead to the associated gate leg diode.

A second coincidence or AND gate is provided which comprises gate leg diodes 65, 69, 71, 73 and 75. Each gate leg diode is connected with a suitable resistance, such as resistance 67, to a source of positive potential. The input to each gate leg diode comprises a pair of input diodes, such as diodes 59 and 61 associated with gate leg diode 65, which are connected through a suitable resistance, such as resistance 63, to a source of negative potential such that the change of either of the input diodes from its normal to its activated state permits a pulse to be passed from the input lead to the gate leg diode associated with the activated input diode.

The two AND gates are buffered through an OR gate comprising diodes 57 and 77 to the control grid 79 of a reshape amplifier tube 81. In accordance with an aspect of the invention, control grid 79 of the tube 81 normally has a cut-off bias potential applied thereto from grid resistance 83 and a negative potential source to maintain tube 81 in a cut-off condition. Tube 81 is triggered into its conducting state only when a triggering pulse is applied to grid 79 from either of the AND gates through their associated buffer diodes 57 or 77.

The reshape amplifier circuit, which advantageously may take any form known in the art, is utilized not only to reshape and retime the AND gate output signals, but also to deliver both the assertion and the negation of the sum digit. As shown in Figure 3, the reshape amplifier circuit comprises a transformer 89 which has its primary winding 87 connected to the anode 85 of tube 81 and which has a pair of secondary windings 91 and 97. The assertion of the sum digit, S, is applied to the output from transformer secondary winding 91 through a suitable delay 95, and also is applied through a feedback diode 93 to control grid 79. The negation of the sum digit, S̄, is applied to the output through a suitable delay 99 and to the control grid 79 of the reshape amplifier tube 81 through a feedback diode 101.

It will be appreciated that when the predetermined combination of input digits is applied to the input leads, as shown in Figure 3, a sum digit will be produced for each two input digits of the two binary numbers supplied to the adder. Thus it may be seen that the single package logical adder of the invention serves as a complete adder in providing the sum of a pair of serially represented binary numbers. In accordance with the invention, this addition function has been carried out without the generation or storage of carry digits.

The techniques which are described above for the single package logical adder may, in accordance with this invention, be applied to a single package logical subtractor for enabling one serially represented binary number to be subtracted from another serially represented binary number without the necessity of generating or storing a borrow digit. Conventionally, in prior art subtraction circuits, the rules for the production of the difference and borrow digits, can be set forth in the following table:

| Inputs | | | Outputs | |
|---|---|---|---|---|
| A | B' | C | D | B |
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

where:

A is the minuend digit;
B' is the borrow digit from the previous lower order subtraction;
C is the subtrahend digit;
D is the difference digit; and
B is the borrow digit.

The above listed subtraction truth table for conventional or normal subtraction circuits shows that the difference digit D and the carry or borrow digit B are identical except for the two input conditions corresponding to inputs of "0 1 1" and "1 0 0," respectively. Thus, if special provisions are made for these two sets of conditions the carry or borrow input normally applied to the subtractor can be replaced by the difference digit.

Figure 4 shows an illustrative embodiment of a subtraction circuit which is adapted to carry out a subtraction operation without the generation or storage of a carry digit in accordance with the above described principles. The carry or borrow digit is eliminated by applying to the single package subtractor (1) the difference digit resulting from the previous lower order set of input digits, (2) the previous lower order set of input digits, and (3) the input minuend and subtrahend digits. In the illustrative embodiment shown in Figure 3 these data digit inputs are realized by feeding into the subtractor 102 the previous difference digit D which is delayed one pulse period, and the previous lower order digits A′ and C′ delayed one pulse period by the use of suitable delay means.

The single package subtractor of Figure 4 comprises the logical subtractor 102 which includes one pulse period of delay. The minuend digit A is applied directly to the subtractor 102 by a conductor 104, and the minuend digit delayed one pulse period A′ is applied to the subtractor 102 through delay means 106 and conductor 108. The subtrahend digit C is applied directly to the subtractor 102 by conductor 110, and the minuend digit with one pulse period of delay C′ is applied to the subtractor 102 through delay means 112 and conductor 114. The difference digit D resulting from the subtraction of the previous set of input digits is applied from the subtractor 102 to an output conductor 116 and is also applied through a feed-back conductor 118 to the input of subtractor 102.

A specific illustrative circuit embodiment of the single package logic subtractor is shown in Figure 5 and comprises a pair of gate circuits 120 and 122 which advantageously are similar to the gate circuits utilized in the adder circuit of Figure 2 and are of the general type shown in the above identified Zimbel and Dean articles. As in the case of the adder circuit of Figure 2, a plurality of gate legs are connected to the inputs of each gate circuit such that all gate legs must be activated in order to pass a pulse through the gate circuit. Each gate leg has a pair of input leads buffered thereto and the required input information is supplied to the input leads in accordance with a predetermined arrangement to provide the desired subtraction function.

Thus, gate circuit 120 has gate legs 124, 130, 136, 142 and 148 connected to its input. Gate leg 124 has buffered thereto a pair of input leads 126 and 128 for receiving signals representative of the previous difference digit D and the complement of the previous minuend digit $\bar{A}'$, respectively. Gate leg 130 has buffered thereto a pair of input leads 132 and 134 for receiving signals representative of the previous difference digit D and the previous subtrahend digit C′, respectively. Gate leg 136 has buffered thereto input leads 138 and 140 for receiving signals representative of the complement of the previous minuend digit $\bar{A}'$ and the previous subtrahend digit C′, respectively. Gate leg 142 has buffered thereto a pair of input leads 144 and 146 for receiving signals representative of the complement of the input minuend digit $\bar{A}$ and the input subtrahend digit C, respectively. Gate leg 148 has buffered thereto a pair of input leads 150 and 152 for receiving signals representative of the input minuend digit A, and the complement of the input subtrahend digit $\bar{C}$, respectively.

In a similar manner gating package 122 has a plurality of gate legs 154, 160, 166, 172 and 178 connected to its input. Gate leg 154 has a pair of input leads 156 and 158 buffered thereto for receiving signals representative of the complement of the previous difference digit $\bar{D}$ and the previous minuend digit A′, respectively. Gate leg 160 has a pair of input leads 162 and 164 buffered thereto for receiving signals representative of the complement of the previous difference digit $\bar{D}$ and the complement of the previous subtrahend digit $\bar{C}'$, respectively. Gate leg 166 has a pair of input leads 168 and 170 buffered thereto for receiving signals representative of the previous minuend digit A′ and the complement of the previous subtrahend digit $\bar{C}'$, respectively. Gate leg 172 has a pair of input leads 174 and 176 buffered thereto for receiving signals representative of the complement of the input minuend digit $\bar{A}$ and the complement of the input subtrahend digit $\bar{C}$, respectively. The remaining gate leg 178 has a pair of input leads 180 and 182 buffered thereto for receiving signals representative of the input minuend digit A and the input subtrahend digit C, respectively.

The output conductor 184 of gate circuit 120 and the output conductor 186 of gate circuit 122 are buffered to a single output conductor 188. The difference digit D corresponding to each pair of input digits applied to the single package subtractor will appear upon output conductor 188 in the form of an electrical pulse for each difference digit corresponding to a binary "1" and no electrical pulse for each difference digit corresponding to a binary "0." The difference digits appearing on output conductor 188 will be in accordance with the following truth table for the single package logical subtractor.

*Subtractor*

| Inputs | | | | | Output |
|---|---|---|---|---|---|
| A | C | D | A′ | C′ | D |
| 0 | 0 | 0 | 0 | 0 | 0 |
| 0 | 0 | 0 | 0 | 1 | 1 |
| 0 | 0 | 0 | 1 | 0 | 0 |
| 0 | 0 | 0 | 1 | 1 | 0 |
| 0 | 0 | 1 | 0 | 0 | 1 |
| 0 | 0 | 1 | 0 | 1 | 1 |
| 0 | 0 | 1 | 1 | 0 | 0 |
| 0 | 0 | 1 | 1 | 1 | 1 |
| 0 | 1 | 0 | 0 | 0 | 1 |
| 0 | 1 | 0 | 0 | 1 | 0 |
| 0 | 1 | 0 | 1 | 0 | 1 |
| 0 | 1 | 0 | 1 | 1 | 1 |
| 0 | 1 | 1 | 0 | 0 | 0 |
| 0 | 1 | 1 | 0 | 1 | 0 |
| 0 | 1 | 1 | 1 | 0 | 1 |
| 0 | 1 | 1 | 1 | 1 | 0 |
| 1 | 0 | 0 | 0 | 0 | 1 |
| 1 | 0 | 0 | 0 | 1 | 0 |
| 1 | 0 | 0 | 1 | 0 | 1 |
| 1 | 0 | 0 | 1 | 1 | 1 |
| 1 | 0 | 1 | 0 | 0 | 0 |
| 1 | 0 | 1 | 0 | 1 | 0 |
| 1 | 0 | 1 | 1 | 0 | 1 |
| 1 | 0 | 1 | 1 | 1 | 0 |
| 1 | 1 | 0 | 0 | 0 | 0 |
| 1 | 1 | 0 | 0 | 1 | 1 |
| 1 | 1 | 0 | 1 | 0 | 0 |
| 1 | 1 | 0 | 1 | 1 | 0 |
| 1 | 1 | 1 | 0 | 0 | 1 |
| 1 | 1 | 1 | 0 | 1 | 1 |
| 1 | 1 | 1 | 1 | 0 | 0 |
| 1 | 1 | 1 | 1 | 1 | 1 |

Thus, it can be seen that in accordance with the above described principles of the invention, a complete subtraction circuit may be provided for a pair of serially represented binary numbers in which there is no need for the generation or storage of a borrow digit.

It will be understood by those skilled in the art that modifications may be made in the construction and arrangement of the specific illustrative embodiments of single package logical adders and subtractors described above without departing from the real purpose and spirit of the invention and that it is intended to cover by the appended claims any modified forms of structures, circuits or use of equivalents which reasonably may be included within their scope.

What is claimed as the invention is:

1. A serial binary adder for summing the input digits of two binary numbers, a first gate having a plurality of gate legs connected such that an output is produced by said first gate only upon the activation of all of said gate legs, a second gate having a second plurality of gate legs connected such that an output is produced by said second gate only upon the activation of all of said second plurality of gate legs, output means buffering the outputs of said first and second gates, and a pair of input leads buffered to each of said gate legs and adapted to receive data digits derived from the input digits, the previously added pair of input digits delayed one pulse period, the digit representative of the sum of the previously added pair of input digits delayed one pulse period, and the complements of the input digits, the previously added digits, and the previous sum digit, whereby a sum digit is applied to said output means from said first and second gates.

2. A serial binary adder adapted provide a sum digit for each pair of input digits applied thereto comprising a first gate including a plurality of gate diodes connected such that an output is produced by said first gate only upon the activation of all of said gate diodes, a second gate including a plurality of gate diodes connected such that an output is produced by said second gate only upon the activation of all of said gate diodes, a pair of input diodes buffered to each of the gate diodes and adapted to receive data digits including the input digits, the previously added pair of digits delayed one pulse period, the digit representative of the sum of the previously added pair of digits delayed one pulse period, and the complements of each of the input digits, the previously added digits, and the previous sum digit, and a pair of output diodes buffered to said first and second gates and adapted to receive a sum digit therefrom which is indicative of the sum of said input digits corrected to account for any required carry from the previously added digits.

3. A serial binary adder in accordance with claim 2 which further comprises reshape amplifier means buffered to said pair of output diodes.

4. A single package logical binary adder for summing two binary numbers which comprises a first gate having five gate legs connected for producing an output from said first gate only when all five of said gate legs are activated, a pair of input leads buffered to a first gate leg for respectively receiving the previous sum digit and the complement of the previous lower order addend digit, a pair of input leads buffered to a second gate leg for respectively receiving the previous sum digit and the complement of the previous lower order augend digit, a pair of input leads buffered to a third gate leg for respectively receiving the complements of the previous lower order addend and augend digits, a pair of input leads buffered to a fourth gate leg for respectively receiving the complements of the addend and augend digits to be added and a pair of input leads buffered to the fifth gate leg for respectively receiving the addend and augend digits to be added, a second gate having five gate legs connected for producing an output only when all five of its gate legs are activated, a pair of input leads buffered to one of the gate legs of said second gate for respectively receiving the complement of the previous sum digit and the previous lower order addend digit, a pair of input leads buffered to a second gate leg of said second gate for respectively receiving the previous lower order augend digit and the complement of the previous sum digit, a pair of input leads buffered to a third gate leg of said second gate for respectively receiving the previous lower order addend and augend digits, a pair of input leads buffered to a fourth gate leg of the second gate for respectively receiving the addend digit to be added and the complement of the augend digit to be added, and a pair of input leads buffered to a fifth gate leg of the second gate for respectively receiving the augend digit to be added and the complement of the addend digit to be added and output means buffered to the outputs of said first and second gates for producing upon an output line the sum digit of each pair of input digits corrected to account for any required carry from the previously added lower order digits.

5. A single package logical binary adder for summing two binary numbers which comprises a first AND gate having five diode legs, a first OR gate comprising a pair of diodes connected to one diode leg for respectively receiving signals representative of the previous sum digit and the complement of the previous lower order addend digit, a second OR gate comprising a pair of diodes connected to a second diode leg for respectively receiving signals indicative of the previous sum digit and the complement of the previous lower order augend digit, a third OR gate comprising a pair of diodes connected to a third diode leg for respectively receiving signals representative of the complements of the previous lower order addend and augend digits, a fourth OR gate comprising a pair of diodes connected to a fourth diode leg for respectively receiving signals representative of the complements of the addend and augend digits to be added, and a fifth OR gate comprising a pair of diodes connected to a fifth diode leg for respectively receiving signals representative of the addend and augend digits to be added, a second AND gate having five diode legs, a first OR gate comprising a pair of diodes connected to one diode leg of said second AND gate for respectively receiving signals representative of the complement of the previous sum digit and the previous lower order addend digit, a second OR gate comprising a pair of diodes connected to a second diode leg of said second gate for respectively receiving signals representative of the previous lower order augend digit and the complement of the previous sum digit, a third OR gate comprising a pair of diodes connected to the third diode leg of said second gate for respectively receiving signals representative of the previous lower order addend and augend digits, a fourth OR gate comprising a pair of diodes connected to the fourth diode leg of the second gate for respectively receiving signals representative of the addend digit to be added and the complement of the augend digit to be added and a fifth OR gate comprising a pair of diodes connected to the fifth diode leg of the second gate for respectively receiving signals representative of the augend digit to be added and the complement of the addend digit to be added and diode means buffering the outputs of said first and second AND gates for producing upon an output line signals representative of the new sum digit.

6. A serial binary adder adapted to provide sum digits for two binary numbers applied thereto comprising a first AND gate, a plurality of OR gates connected to the input of said first AND gate, a second AND gate, a second plurality of OR gates connected to the input of said second AND gate, input leads connected to each of said OR gates and adapted to receive data digits comprising combinations of the digits to be added, the previous lower order digits delayed one pulse period, the sum digit of the previous lower order digits, said sum digit having delay of one pulse period, and the complements of the digits to be added, the previous lower order digits, and the previous sum digit, output means and an OR gate connecting said first and second AND gates to the output means whereby a sum digit is applied to said output means from said first and second AND gates which is indicative of the sum of digits to be added, corrected to account for any required carry from the previously added digits.

7. An electronic computer for computing a pair of serially represented binary numbers comprising a first gate having a plurality of gate legs connected such that an output is produced by said first gate only upon the activation of all of said gate legs, a second gate having a second plurality of gate legs connected such that an output is produced by said second gate only upon the activation of all of said second plurality of gate legs, output means buffering the outputs of said first and second gates and a pair of input leads buffered to each of said gate legs and adapted to receive combinational pairs of data digits comprising the input digits, the previously added pair of input digits delayed one pulse period, the output digit of the previously computed pair of input digits, said output digit having an inherent delay of one pulse period, and the complements of each of the input digits, previously computed digits, and previous output digit, whereby an output digit is applied to said output means from said first and second gates which is corrected to account for any required carry from the previously computed digits.

8. An electronic computer for computing a pair of serially represented binary numbers comprising a first gate having a plurality of diodes connected such that an output is produced by said first gate only upon the activation of all of said diodes, a second gate having a second plurality of diodes connected such that an output is produced by said second gate only upon the activation of all of said second plurality of diodes, a pair of output diodes buffering the outputs of said first and second gates and a pair of input diodes buffered to each diode in said first and second gate, the pairs of input diodes being adapted to receive combinational pairs of data digits comprising the digits to be computed, the previously computed pair of digits delayed one pulse period, the output digit of the previously computed pair of digits, said output digit having an inherent delay of one pulse period, and the complements of each of the digits to be computed, the previously computed digits, and the previous output digit, whereby an output digit is applied to said output means from said first and second gates which is corrected to account for any required carry from the previously computed digits.

9. An electronic computer in accordance with claim 8 wherein said output means comprises a reshape amplifier normally biased to cut-off and adapted to be triggered into conduction by an output digit from said first and second gates.

10. An electronic computer for computing a pair of serially represented binary numbers comprising a first AND gate having a plurality of diode gate legs, a second AND gate having a second plurality of diode gate legs, an OR gate including a pair of diodes connected to the input of each of the diode gate legs and adapted to receive combinational pairs of data digits comprising the digits to be computed, the previously computed pair of digits delayed one pulse period, the output digit of the previously computed pair of digits delayed one pulse period, and the complements of the digits to be computed, the previously computed digits, and the previous output digit, and output means comprising an OR gate having a pair of diodes for receiving an output digit from said first and second AND gates which is corrected to account for any required carry from the previously computed digits.

11. A serial binary subtractor adapted to provide a difference digit comprising a first gate having a plurality of gate legs connected such that an output is produced by said first gate only upon the activation of all of said gate legs, a second gate having a second plurality of gate legs connected such that an output is produced by said second gate only upon the activation of all of said second plurality of gate legs, output means buffering the outputs of said first and second gates and a pair of input leads buffered to each of said gate legs and adapted to receive data digits derived from the two input digits, the previously subtracted pair of digits delayed one pulse period, the difference digit of the previously subtracted pair of digits delayed one pulse period and the complements of the input digits, the previously subtracted digits and the previous difference digit whereby a difference digit is applied to said output means from said first and second gates which is indicative of the difference of said input digits corrected to account for any required carry from the previously subtracted digits.

12. A serial binary subtractor adapted to provide a difference digit comprising a first gate including a plurality of gate diodes connected such that an output is produced by said first gate only upon the activation of all of said gate diodes, a second gate including a plurality of gate diodes connected such that an output is produced by said second gate only upon the activation of all of said gate diodes, a pair of input diodes buffered to each of said gate diodes and adapted to receive data digits including the two input digits, the previously subtracted pair of digits delayed one pulse period, the difference digit of the previously subtracted pair of input digits delayed one pulse period and the complements of each of the input digits, the previously subtracted digits and the previous difference digit, and a pair of output diodes buffered to said first and second gates and adapted to receive a difference digit therefrom.

13. A serial binary subtractor in accordance with claim 12 which further comprises reshape amplifier means buffered to said pair of output diodes.

14. A serial binary subtractor adapted to provide a difference digit comprising a first AND gate having a plurality of diode gate legs, a second AND gate having a second plurality of diode gate legs, and a plurality of input diodes defining OR gates buffered to the gate legs in each AND gate and adapted to receive data digits including the two input digits, the previously subtracted pair of digits delayed one pulse period, the difference digit of the previously subtracted pair of digits delayed one pulse period and the complements of each of the input digits, the previously subtracted digits and the previous difference digit, and a plurality of output diodes defining an OR gate buffered to the outputs of said first and second AND gate for receiving a difference digit therefrom.

15. A serial binary subtractor adapted to provide a difference digit comprising a first AND gate having five gate legs, an OR gate buffered to a first gate leg for receiving the previous difference digit and the complement of the previous minuend digit delayed one pulse period, an OR gate buffered to a second gate leg for receiving the previous difference digit and the previous subtrahend digit delayed one pulse period, an OR gate buffered to a third gate leg for receiving the complement of the previous minuend digit deayed one pulse period and the previous subtrahend digit delayed one pulse period, an OR gate buffered to the fourth gate leg for receiving the complement of the input minuend digit and the input subtrahend digit, and an OR gate buffered to a fifth gate leg for receiving the input minuend digit and the complement of the input subtrahend digit, a second AND gate having five gate legs, an OR gate receiving the complement of the previous difference digit and the input minuend digit delayed one pulse period, an OR gate buffered to a second gate leg for receiving the complement of the previous difference digit and the complement of the previous subtrahend digit delayed one pulse period, an OR gate buffered to a third gate leg for receiving the previous minuend digit delayed one pulse period and the complement of the previous subtrahend digit delayed one pulse period, an OR gate buffered to a fourth gate leg for receiving the complements of the input minuend and subtrahend digits and an OR gate buffered to a fifth gate leg for receiving the input minuend and subtrahend digits, and an output OR gate buffered to said first and second AND gates for receiving a difference digit from said first and second AND gates.

16. Apparatus for making a mathematical computation with respect to a pair of binary numbers comprising a computer circuit formed as a single logical package, a pair of input circuits connected to apply electrical representations of said pair of binary numbers to said computer circuit, an output circuit connected to said computer circuit which has therein electrical representations of the computed result, and means connecting said output circuit to said input circuit for selective combination with the digits on said input circuits.

17. A serial binary adder comprising a single logical package having input circuits adapted to receive a pair of binary numbers to be added, an output circuit connected to said package and having therein the sum digit of the input digits, means connecting said output circuit to said input circuits, and means storing the input digits creating a sum digit until said sum digit is received at said input circuits so that said stored digits and said sum digit are applied simultaneously to selected ones of said input circuits.

18. A serial binary subtractor comprising a single logical package having input circuits adapted to receive a pair of binary numbers to be subtracted, an output circuit connected to said package and having therein the difference digit of the input digits, means connecting said output circuit to said input circuits, and means storing the input digits creating a difference digit until said difference digit is received at said input circuits so that said stored digits and said difference digit are applied simultaneously to selected ones of said input circuits.

19. A serial binary computer comprising a logical package having input circuits adapted to receive a pair of binary numbers on which a computation is to be made, an output circuit connected to said package and having therein the computed digit of the input digits, means connecting said output circuit to said input circuits, and means storing the input digits creating a computed digit until said computed digit is received at said input circuits so that said stored digits and said computed digit are applied simultaneously to selected ones of said input circuits.

References Cited in the file of this patent

UNITED STATES PATENTS

| | | |
|---|---|---|
| 2,571,680 | Carbrey | Oct. 16, 1951 |
| 2,719,670 | Jacobs | Oct. 4, 1955 |
| 2,775,402 | Weiss | Dec. 25, 1956 |
| 2,805,020 | Lanning | Sept. 3, 1957 |
| 2,879,001 | Weinberger et al. | Mar. 24, 1959 |